United States Patent [19]
Jäger et al.

[11] Patent Number: 6,083,112
[45] Date of Patent: Jul. 4, 2000

[54] METHOD FOR MANUFACTURING PLASTIC BOWLING PINS

[75] Inventors: Arnold Jäger, Gehrbergsweg 6, D-31303 Burgdorf, Germany; Claudius Jäger, Lafayette, Colo.

[73] Assignee: Arnold Jäger, Germany

[21] Appl. No.: 09/121,955

[22] Filed: Jul. 24, 1998

[30] Foreign Application Priority Data

Sep. 23, 1997 [DE] Germany .......................... 197 41 904

[51] Int. Cl.[7] ...................................................... A63D 9/00
[52] U.S. Cl. ........................................... 473/118; 473/119

[56] References Cited

U.S. PATENT DOCUMENTS 3,619,436 11/1971 Gruss .
5,510,067 4/1996 Jager et al. .

*Primary Examiner*—William M. Pierce
*Attorney, Agent, or Firm*—Robert W. Becker & Associates

[57] ABSTRACT

A method for manufacturing a plastic bowling pin that has a porous core and a resilient envelope includes the step of blow-forming the envelope in a blowing mold and removing the envelope from the blowing mold. The envelope is then cooled to a temperature of 60° C. to 100° C. A core plastic material containing an exothermic agent is then injected into the envelope for forming the core. The core plastic material is heated to a temperature of 200° C. to 260° C. The inner layer of the envelope is thus fused to the plastic material of the core to provide an intimate connection between the envelope and the core.

4 Claims, 2 Drawing Sheets

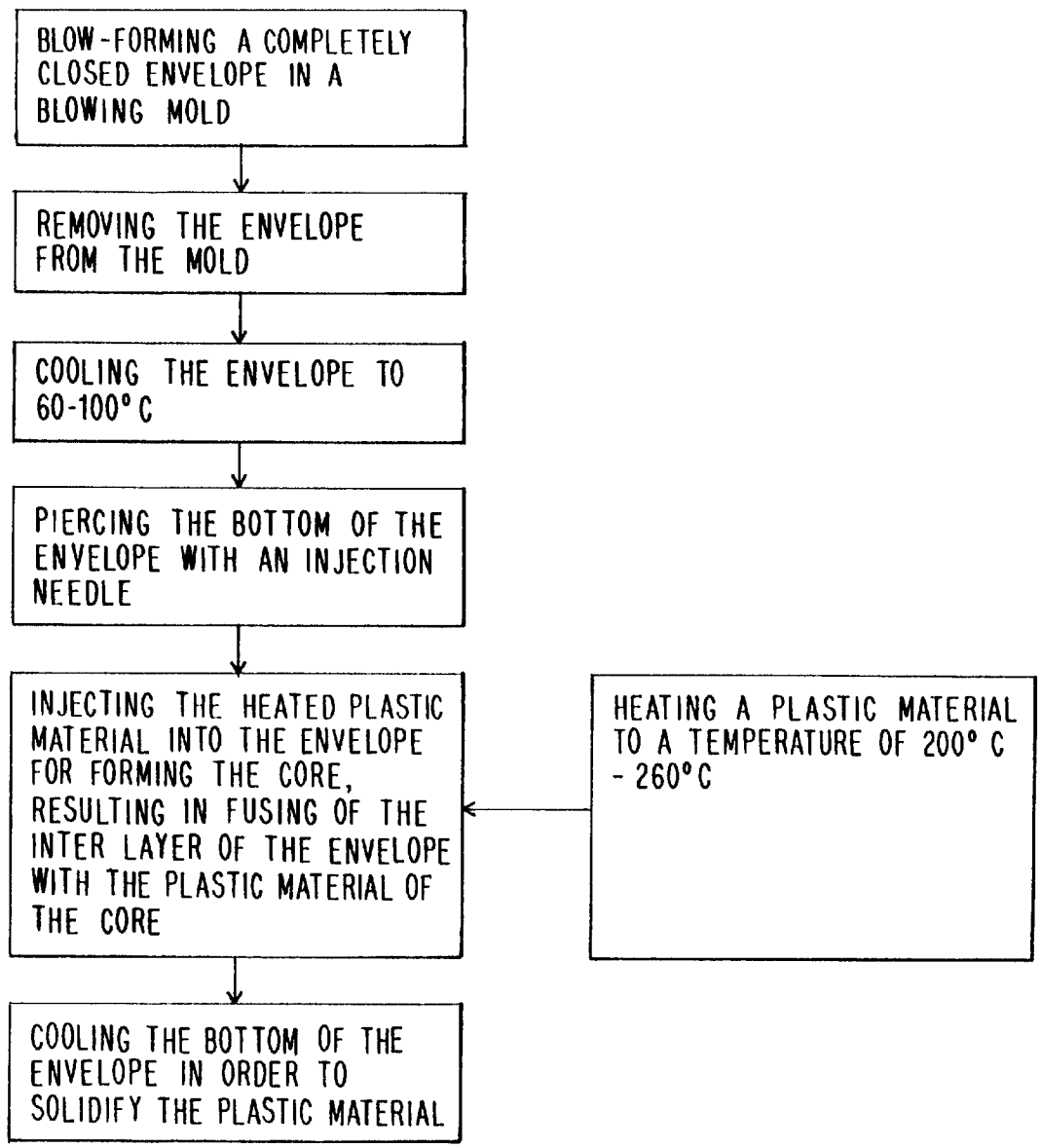
FIG. 4 FLOW CHART OF METHOD

METHOD FOR MANUFACTURING PLASTIC BOWLING PINS

BACKGROUND OF THE INVENTION

The present invention relates to a method for manufacturing plastic bowling pins having a resilient envelope or wall and a porous and/or cellular core whereby a plastic material containing a blowing agent is injected into the envelope, produced by a blow-forming method and removed from the blowing mold in order to produce the core.

In known methods of this kind, the envelope is heated outside of the blowing mold to approximately 100° to 120° C. Subsequently, the plastic material for forming the core is injected at a temperature of approximately 180° C.

It is especially difficult in this context to provide an intimate connection between the plastic core and the envelope.

It is therefore an object of the present invention to improve the method of the aforementioned kind such that a very intimate connection between the envelope and the plastic core results.

SUMMARY OF THE INVENTION

The method for manufacturing a plastic pin comprising a porous core and a resilient envelope according to the present invention is primarily characterized by:

blow-forming the envelope in a blowing mold;

removing the envelope from the blowing mold;

cooling the envelope to a temperature of 60° C. to 100° C.;

injecting a plastic material containing an exothermic blowing agent into the envelope for forming the core;

heating the plastic material to a temperature of 200° C. to 260° C.;

fusing an inner layer of the envelope to the plastic material of the core.

Preferably, in the step of injecting the amount of blowing agent is selected such that the inner pressure resulting from expansion of the plastic material does not affect the outer dimensions of envelope portions that are not supported at mold walls.

The inner layer of the envelope is preferably heated during step e) to 180° C. to 200° C. in order to facilitate fusing.

Advantageously, the method further includes the step of cooling the bottom of the pin after step d) in order to solidify the plastic material at the bottom of the pin so that no plastic material can exit when the injection needle is removed.

According to the present invention, the envelope is cooled before injection of the core plastic material to approximately 60° C. to 100° C. and the injection of the core plastic material, containing the exothermic blowing agent, is performed such that the plastic material for the core is heated to a temperature of approximately 200° C. to 260° C. and the inner layer of the envelope is fused to the plastic material of the core. In this context it is expedient when the blowing agent of the core plastic material is selected such and its amount is measured such that upon expansion of the plastic material the resulting interior pressure will essentially not change the outer dimensions of the envelope. Accordingly, the envelope can be without a support mold during injection. In special cases, especially in the case where greater dimensional precision is required, the envelope may be introduced into a support mold which, however, for avoiding tension within the envelope material, is not provided at certain location but encloses the envelope over a surface area that is as large as possible.

BRIEF DESCRIPTION OF THE DRAWINGS

The object and advantages of the present invention will appear more clearly from the following specification in conjunction with accompanying drawings, in which:

FIG. 4 is a flow chart of the inventive method steps.

DESCRIPTION OF PREFERRED EMBODIMENTS

The present invention will now be described in detail with the aid of a specific embodiment utilizing FIGS. 1 through 3.

Figure 1:
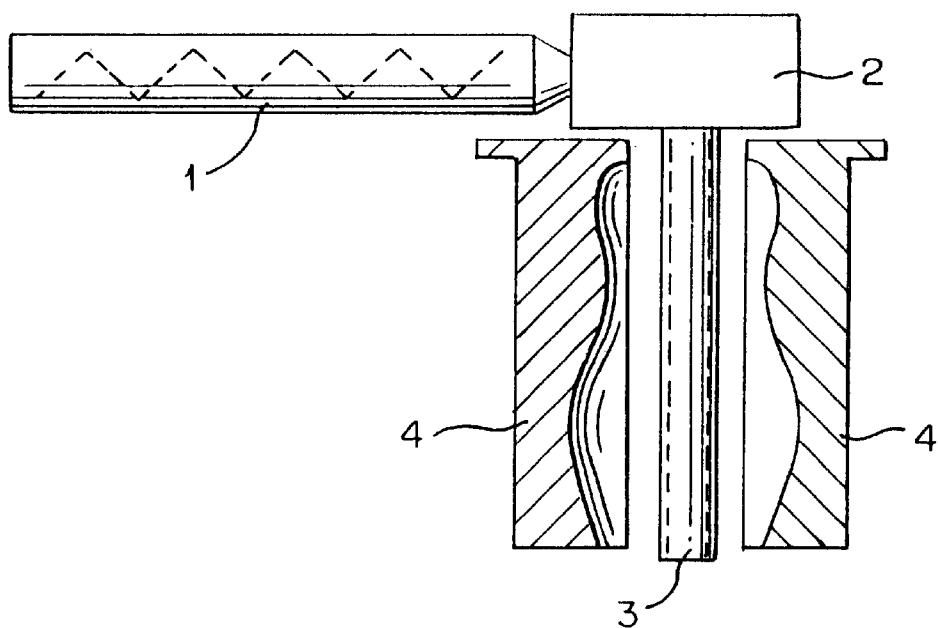
FIG. 1 shows a device for blow-forming of the pin envelope.
Figure 2:
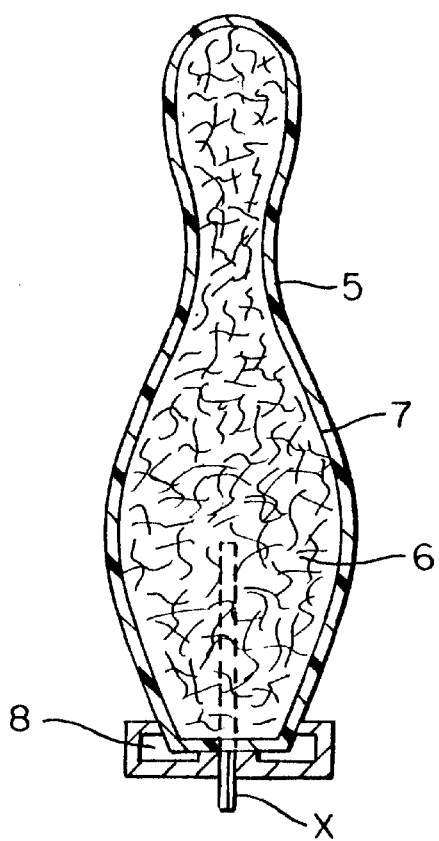
FIG. 2 shows the envelope filled with the core plastic material in section.

The device according to FIG. 1 is comprised substantially of an extruder 1 with a blow-forming head 2 for producing a hose 3 for forming the envelope 5 of the plastic pin. The two mold halves, in FIG. 1 not yet in the closed position, are indicated by reference numeral 4.

For producing the envelope 5, a plastic material, preferably a plastic material such as polypropylene, is melted at a temperature of approximately 160° C. to 220° C. within the extruder 1. Via the blow-forming head 2 the hose 3 is produced which, depending on the desired diameter of the pin, has a certain wall thickness. The cold mold halves 4 at a temperature of approximately 4° C. to 12° C. are then closed. The hose 3 is cut to length and blown into the mold. Since the plastic material of the hose, when exiting the blow-forming head 2, has a temperature of approximately 180° C., the blown hose will be cooled to a depth of approximately 3 mm to 5 mm at the aforementioned temperature of the mold halves 4 to read a temperature of approximately 60° C., while in the interior of the envelope 5, respectively, at the inner layer of the envelope 5 a temperature of approximately 130° C. to 150° C. is present.

The envelope 5 is then cooled such that across its cross-section it has a temperature of approximately 60° C. to 100° C. Subsequently, the envelope 5 is introduced into an injection machine having an injection needle 6 which is introduced deeply into the interior of the envelope 5. The core plastic material, for example, polyamide or polypropylene, containing an exothermic blowing agent, is then injected into the interior of the envelope 5 whereby the blowing agent should be approximately 0.2% to 5% by volume of the total mass of the plastic material. Preferably, the blowing agent is used in a range of 0.2% to 0.8% by volume of total mass. This plastic material was melted within the injection machine and heated to a temperature of approximately 200° C. to 260° C. When injected, it impinges on the inner layer of the envelope 5 which is at a temperature of approximately 60° C. to 100° C. and thus heats the inner layer to a temperature of approximately 180° C. to 200° C. whereby the inner layer of the envelope and the outer layer of the core plastic material can thus meld or fuse together.

During this process the inner pressure produced by the blowing agent within the core plastic material may not surpass the mechanical strength properties of the envelope. This means the envelope 5 must be dimensionally stable. Ideally, the envelope 5 during injection, respectively, during the blowing step of the core plastic material, should not be in contact with mold parts, respectively, any foreign bodies, in order to prevent cooling of the outer layer of the envelope 5. This prevents stress within the wall (envelope) of the plastic pin. Such stress could result in breakage of the envelope 5. However, when an especially great dimensional precision of the plastic pin is required, the envelope 5 for blowing of the core plastic material is introduced into a support mold that surrounds the envelope on all sides, i.e., has a shape corresponding to the shape of the mold halves 4.

For the blow-forming method and the injection method any suitable device can be employed. Performing the inventive method is thus not limited to certain devices and machines. However, it is expedient to cool the bottom portion of the plastic pin with a cooling element 8 such that upon removal of the injection needle x no core plastic material can exit from the envelope 5. The cooled core plastic material at the bottom thus forms a plug which practically closes off the opening at the bottom of the plastic pin.

Figure 3:
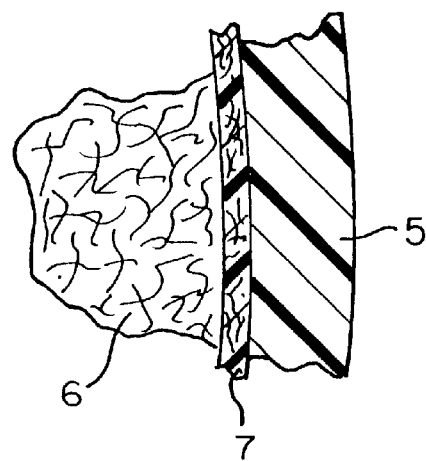
FIG. 3 shows a section of a portion of the envelope of a finished plastic pin.

As can be seen in FIG. 3, in the finished plastic pin, the core 6 and the envelope 5 are fused or melded to form a layer 7 between them. In this area, which is indicated by a special cross-hatching in the drawing, the core plastic material and the plastic material of the envelope are fused together, respectively, are melded.

Furthermore, it should be noted that for the core plastic material as well as for the plastic material of the envelope a thermoplastic material can be used. Polyamide and polypropylene or plastic materials based on these two base materials are especially suitable. The envelope 5 has preferably a shore D hardness of 61–73, preferably of 66–67.

The plastic pin of the present invention includes bowling pins and game pins for similar games.

The specification incorporates by reference the disclosure of German priority document 197 41 904.6 of Sep. 23, 1997.

The present invention is, of course, in no way restricted to the specific disclosure of the specification and drawings, but also encompasses any modifications within the scope of the appended claims.

What is claimed is:

1. A method for manufacturing a plastic pin comprising a porous core and a resilient envelope, said method comprising the steps of:

a) blow-forming a completely closed envelope in a blowing mold;

b) removing the envelope from the blowing mold;

c) cooling the envelope to a temperature of 60° C.–100° C.;

d) heating a plastic material to a temperature of 200° C.–260° C.;

e) piercing a bottom of the envelope with an injection needle and injecting the heated plastic material containing an exothermic blowing agent into the envelope for forming the core, wherein an inner layer of the envelope is heated by the heated plastic material and thereby fuses with the plastic material of the core; and f) cooling the bottom of the envelope in order to solidify the plastic material at the bottom of the envelope so that no plastic material can exit when the injection needle is removed.

2. A method according to claim 1, wherein in the step e) an amount of the exothermic blowing agent is selected such that an inner pressure, resulting from expansion of the plastic material, does not change outer dimensions of the envelope.

3. A method according to claim 2, wherein in the step e) the envelope is supported in a support mold, having a shape matching the shape of the blowing mold, for producing plastic pins of great dimensional precision.

4. A method according to claim 1, wherein the inner layer of the envelope is heated by the heated plastic material to 180° C.–200° C. in order to facilitate fusing.

* * * * *